United States Patent [19]

Hoppe et al.

[11] 4,208,231

[45] Jun. 17, 1980

[54] METHOD OF MAKING MULTILAYER EDGE-SEALED RECORD CARRIER

[75] Inventors: Joachim Hoppe; Yahya Haghiri-Tehrani, both of Munich; Wolfgang Gauch, Otterfing, all of Fed. Rep. of Germany

[73] Assignee: G.A.O. Gesellschaft für Automation und Organisation mbH, Fed. Rep. of Germany

[21] Appl. No.: 861,343

[22] Filed: Dec. 16, 1977

[30] Foreign Application Priority Data

Dec. 29, 1976 [AT] Austria ................................ 9780/76

[51] Int. Cl.$^{2}$ ........................ B32B 31/00; G09F 3/02; B42D 15/02

[52] U.S. Cl. .................................... 156/247; 156/249; 156/252; 156/256; 156/277; 156/289; 40/2.2

[58] Field of Search ............... 156/234, 240, 247, 249, 156/256, 252, 277; 40/2.2

[56] References Cited

U.S. PATENT DOCUMENTS

| | | | |
|---|---|---|---|
| 2,588,067 | 3/1952 | Whitehead | 40/2.2 |
| 3,413,171 | 11/1968 | Hannon | 156/277 |
| 3,414,998 | 12/1968 | Berger | 40/2.2 |
| 3,533,176 | 10/1970 | Weitzberg et al. | 40/2.2 |
| 4,006,050 | 2/1977 | Hurst et al. | 156/234 |
| 4,096,015 | 6/1978 | Kawamata et al. | 156/277 X |

*Primary Examiner*—William A. Powell
*Assistant Examiner*—L. E. Rodgers
*Attorney, Agent, or Firm*—McGlew and Tuttle

[57] ABSTRACT

In one method of making the record carrier, a paper sheet is formed with an almost completely perforated punch or blanking line defining a paper insert or core, and a separating layer is applied to the upper surface of the paper sheet in bordering relation with the punch or blanking line. A thin film border is positioned on the separating layer and overlaps, inwardly, the punch or blanking line. A backing film is provided with a silicone separating layer congruent with the paper insert, and is applied to the back of the paper sheet. The thus assembled layers are then laminated to each other. The paper insert and the thin film border are then printed, without transition, in at least one printing operation. After the printing, the backing film and the paper sheet are separated from the paper insert and the thin film border. The resulting composite insert or core is then sealed between the two transparent films. In another method, a paper insert is positioned on a backing film and embedded therein. The paper insert and the film area surrounding the paper insert are then printed, without transition, in at least one printing operation. The resulting composite insert or core is then sealed between the two transparent films.

4 Claims, 11 Drawing Figures

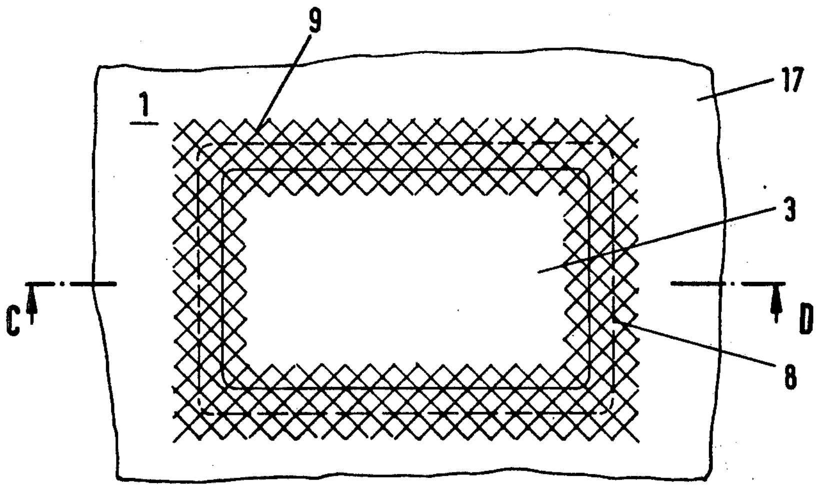
FIG. 6
FIG. 7
FIG. 8
FIG. 9
FIG. 10

METHOD OF MAKING MULTILAYER EDGE-SEALED RECORD CARRIER

FIELD AND BACKGROUND OF THE INVENTION

The present invention relates to a multilayer, edge-sealed record carrier with a laminated, printed paper insert or core.

A number of different identification cards are known each of which has its advantages and disadvantages and more or less fulfills the requirements to be met. For example, there are all-plastic cards and multilayer plastic cards without a paper insert and with a printed pattern on the film surface which are very resistant to moisture, dirt, and the like, but are not suited for all purposes because of their simple structure. In particular, such cards are easy to counterfeit, so they appear unserviceable if they represent values.

There are also paper-laminated cards without an edge seal in which the printed matter is imposed on the paper insert (U.S. Pat. No. 3,533,176). These cards provide better protection against forgery because of the laminated paper inlet. Since the film edge is flush with the edge of the paper insert, the printed matter is automatically accurately positioned relative to the card edge. However, such paper-laminated cards without an edge seal have the disadvantage that, after long use or with intent to defraud, delamination is possible at the edge, and that moisture and dirt may penetrate at the edge of the card.

For this reason, paper-laminated, edge-sealed cards have been proposed which have a transparent or colored film edge but are not printed in the sealed area (U.S. Pat. No. 3,414,998). These cards offer only limited protection against forgery, but because of the edge seal, they are resistant to moisture and dirt. Since, however, the edges of the card are not printed, the edge seal can be easily removed and renewed with intent to defraud. As these cards are usually manufactured with so-called film pockets into which the paper insert is inserted and which is finally sealed, the positioning of the print with respect to the card edge is extremely difficult. Furthermore, the design of these cards is of inferior quality.

SUMMARY OF THE INVENTION

Accordingly, the object of the invention is to provide an edge-sealed identification card or the like having a laminated paper (security) insert or core which preserves the advantages of the known card types but does not have their disadvantages.

According to the invention, the information-carrying layer is a composite insert or core sheet which consists at least of a paper insert sheet and a film border and is printed without transition both on the paper and on the film border in one or more printing operations. The composite core sheet is sealed between transparent films in such a way that, on the one hand, a paper-to-film laminate and, on the other hand, a film-to-film seal with respective intermediate safety print, are obtained.

The invention provides an identification card which is protected against environmental influences and delamination and preserves the advantages of the identification card without an edge seal, namely extension of the printed pattern to the extreme card edge and accurate positioning of the print relative to the card edge with improved safety against forgery.

U.S. Pat. No. 2,588,067 also proposes an edge-sealed identification card wherein lines imposed on the transparent cover films form a pattern extending to the edge of the card and covering the normal printed information of the card. However, since this line pattern turns very easily into a random pattern during the laminating process, and since this line pattern bears no reference to the general typography of the paper insert, neither a reproducible and, thus, precisely controllable printed pattern nor a qualitatively good appearance of the card is obtained. Since the line pattern is superimposed on the actual card data, in addition to the outward appearance being adversely affected, the mechanical verification of the card data is made much more difficult or partly impossible.

By contrast, the identification card according to the invention has an exact line pattern (guilloches) up to the edge in which even very fine displacements caused by tampering can be clearly detected. If the color of the films of the composite core or insert, which are used in the edge area of the card, is adapted to that of the paper insert, the composite core will appear as an homogeneous layer. Identification cards containing such composite cores are therefore indistinguishable from the known cards without an edge seal.

If transparent composite-insert films or composite-insert films of a different color are used, one can see that there is no paper insert in the edge area of the card, but since all printed information extends to the outer card edge without disturbing the topography and is clearly positioned with respect to the card edge, and since no additional pattern is superimposed on the printed matter, the identification card, unlike the known cards, is equally well suited for visual and mechanical verification.

BRIEF DESCRIPTION OF THE DRAWINGS

The invention will now be explained in more detail by the examples of two different manufacturing methods with reference to the accompanying drawings, in which:

FIG. 6 is a top view of part of a composite-inlet sheet for the manufacture of identification cards by the second manufacturing method;

FIGS. 7 to 10 are sectional views of the composite inlet of FIG. 6 during the individual process steps.

DESCRIPTION OF THE PREFERRED EMBODIMENTS

Figure 1:
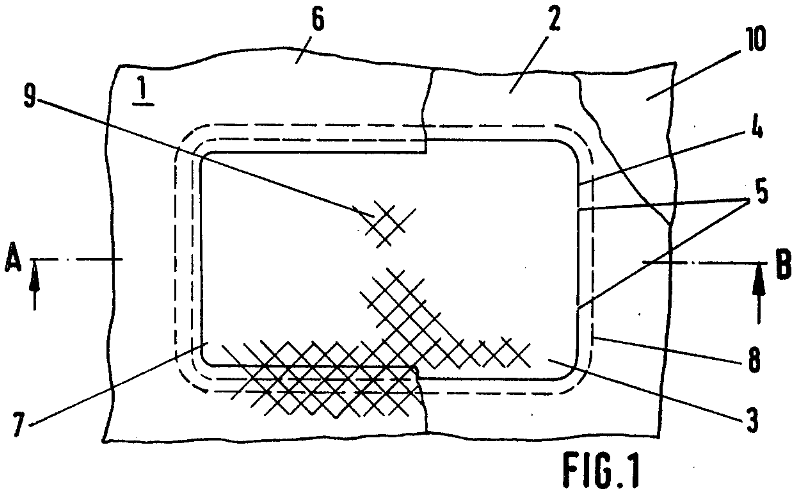
FIG. 1 is a top view of a multilayer printed sheet as is necessary for the manufacture of the identification cards by the first manufacturing method.
Figure 2:
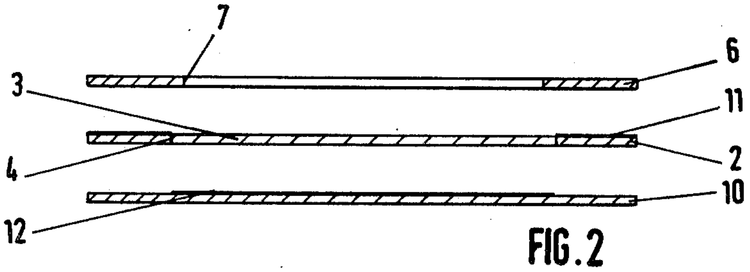
FIGS. 2 to 5 show the laminate structure of the printed sheet of FIG. 1 and of the subsequent identification-card sheet during the individual process steps in sections taken along line A-B.

Before explaining the invention, a brief outline of the manufacture of known identification cards with laminated paper insert and without edge seal will be given.

The manufacture of these identification cards consists essentially of three process steps. In the first process step, the paper insert is manufactured. By "paper insert", the layer of paper embedded between the cover films of the identification card is understood. The paper used for the insert is manufactured in wide webs and provided with watermarks, safety threads, and the like by known anti-counterfeiting techniques known from the manufacture of bank notes. Depending on the size of the laminating apparatus, the webs are cut into individual sheets on which 16, 32 or more blanks are provided. From each sheet, 16, 32 or more identification cards can then be manufactured in an economical manner. The areas of the blanks are then provided with all printed and picture information of the subsequent identification card. For increased safety against forgery, this is done, at least in part, on steel printing machines, for example, which are known from bank-note printing.

Having been provided with all necessary identification-card data, the sheets of paper (security sheets) are laminated for example by heat and pressure in the second process step with two transparent films of the same size made, for example of thermoplastic material. Under pressure and heat, the films interlace with the paper surface, thus imparting to the thin paper insert the necessary stiffness and protecting it from environmental influences.

After the laminated identification-card sheets have cooled down, the individual identification cards are blanked to the final size. The blanking process will be referred to as the third process step.

These three basic process steps of the known methods are preserved in the invention. Since, however, the invention uses no pure paper inserts but so-called composite cores which are not completely of paper but are bordered by a plastic film at least in the edge area, the manufacture of the composite core necessitates supplementing the first and, if need be, second basic process steps by additional partial steps.

Within the scope of the basic principle, various process sequences for manufacturing the composite core cards are conceivable. The following describes only two methods by which the identification cards according to the invention can be manufactured on commercially available apparatus. Depending on the required quality of the identification cards to be manufactured and on the warrantable expenditure, one of the two methods or a combination of individual process steps must be selected.

In the first manufacturing method, composite cores are used in which the individual paper bases are framed with a thin film frame. The thin film frame, made for example of plastic, is designed so that the paper base is framed by the film with a slight over-lap in the manner of a passe-partout.

With the aid of a thicker rear backing layer, the somewhat sensitive composite core can be reinforced so as to be capable of being processed in conventional printing machines. The composite core reinforced by the rear film will be referred to here as the "printed sheet". In the printing process, as mentioned above, care must be taken to ensure that the print from the paper surface across the film edge and, possibly, beyond the subsequent card edge, forms a continuous pattern. At the end of the printing process, the backing layer, together with the pre-punched or cut paper edge, is separated from the printed sheet, and the composite core can then be laminated between transparent films of plastic for example. Finally, the identification card can be blanked out.

The individual process steps and the structure of the card are shown schematically in FIGS. 1 to 5. FIG. 1 shows a printed sheet 1 which, unlike the known sheets of paper, has a multilayer structure, as was mentioned above. For simplicity, the printed sheet shown contains only one blank from which the finished identification card is blanked along the punch lines 8 in the last process step after cover films have been applied. In series production, however, it is recommended to process multi-blank sheets.

The printed sheet 1 consists of a total of five layers 6, 11, 2, 12, and 10 which are partly prepared in separate operations and united in a first laminating process. The structure and arrangement of the individual layers are particularly apparent from FIG. 2. The general appearance of the printed sheet 1 is determined primarily by a sheet of paper (security sheet) 2 which is provided in the printed sheet 1 as the middle layer. Like in the manufacture of known identification cards, the sheet of paper 2 is provided with watermarks, safety threads, and the like. Unlike in the known methods, however, the paper insert 3 in the sheet of paper 2 has already been cutout or punched along the line 4, leaving only four narrow holding bridges 5. On the upper side of the sheet of paper 2, a silicone edge or margin 11 is printed in the edge area of the insert 3. This silicone edge 11 extends slightly inwardly beyond the punched line 4 into the paper insert 3. Disposed above this silicone edge 11 is a thin film border 6 whose rim 7 extends inwardly beyond the punched line 4 and the silicone print 11 into the paper insert 3. At the back, the sheet of paper 2 is completely covered by the backing film 10 which is, for example, made of plastic. In the areas of the paper insert 3, the film 10 is provided with a silicone layer 12 in such a way that, after all layers have been united, the edges of the silicone area 12 are flush with the punched lines 4.

Since some layers of the printed sheet 1 are only fractions of a millimeter thick, the layers in the figures are not shown to scale for clarity. In reality, sheets of paper 2 approximately 0.1 to 0.2 mm in thickness are used, whereas the rear backing film 10 is approximately 0.3 to 0.6 mm thick. By contrast, the cover film used for the film edge 6 is approximately 0.06 mm in thickness. The thickness of the silicone layers 11 and 12 is shown in the drawing because of the importance of these layers but is negligible in practice.

Figure 3:
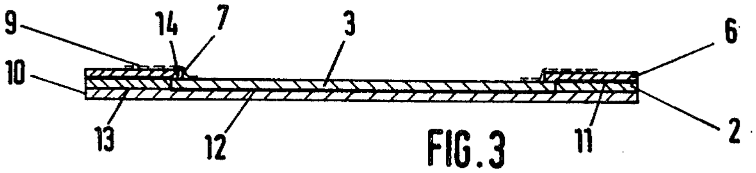

In a first laminating process, the individual layers 6, 2, and 11 are united under heat and pressure in the correct relative position (FIG. 3). As the silicone layers prevent an intimate combination of paper and films, during the lamination, only the areas 14 (FIG. 3) formed, on the face of the paper by the overlapping edge 7 of the film 6 fuse with the paper blank 3, and the areas 13 of the backing film 10, which are not coated with silicone, with the underside of the paper frame formed by the punched lines 4.

Although only very small areas of the films 6 and 10 have been sealed with the sheet of paper 2 after the laminating process, the individual layers adhere so well over their whole area that the printed sheet 1 can be considered a compact unit. The printed sheet 1 is therefore excellently suited to being processed in commercially available printing machines in which the whole or part of the upper side is printed with the identification-card data. As indicated by the stylized printed pattern 9, in the intention of the invention, care should be taken to ensure that the print extends without interruption from the paper surface surrounded by the film 6 over the film edge 7 and possibly over the subsequent identification-card edge 8. Since, as mentioned above, the thickness of the film 6 is only a fraction of that shown, the printing process is not hindered by the film edge 7 in any way.

At the end of the printing process, the backing film 10 is removed from the back of the printed sheet 1. Since, as a result of the lamination, the backing film 10 is tightly bonded in the areas 13 (FIG. 3) to the underside of the punched paper edge, and the silicone layer 11 prevents any tight adherence of the upper side of the paper edge, simultaneously with the removal of the backing film 10, the paper edge is detached from the film 6 and the paper insert 3. With the removal of the backing film 10, the unpunched holding bridges 5, by which the paper insert 3 is connected with the edge of the paper, are separated without any damage to the inlet 3. Silicone layers 11 and 12 thus act as release or separating layers.

Figure 4:
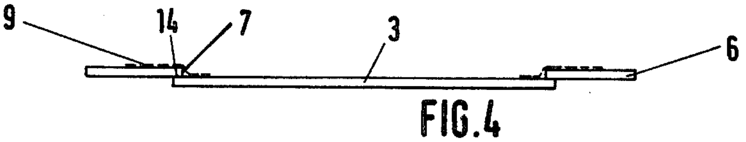
Figure 5:
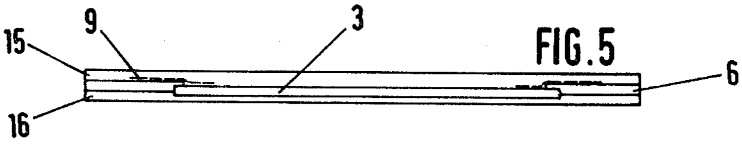
Figure 11:
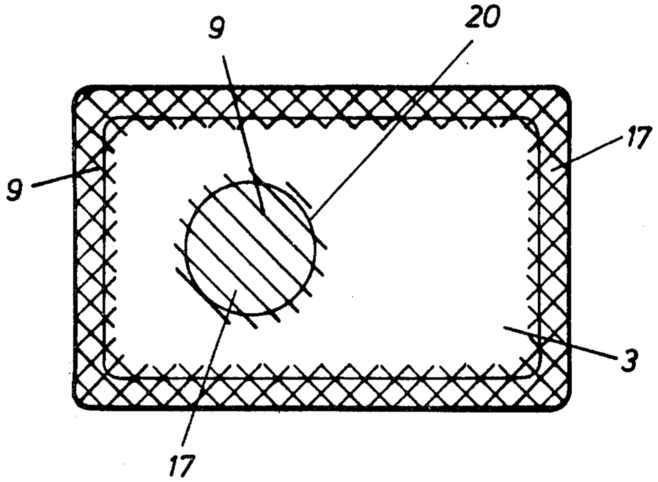
FIG. 11 is a top view of an identification card manufactured by the second manufacturing method.

As can be seen in FIG. 4, after the film 10 has been removed, only the film edge 6 and the paper insert attached in the opening of the film remain as the actual composite-core sheet. This composite-core sheet, printed on one side, can now be lamination-encapsulated, in known manner, between two cover films 15 and 16 of plastic, for example, either alone or together with a second composite-core sheet which then carries the printed information of the back of the identification card. After the identification-card sheet shown in FIG. 5 has cooled down, the identification card is blanked to its final size along the punched lines 8 (FIG. 1) in the last operation.

FIGS. 6 to 11 show the second manufacturing method, which is less expensive but also not of such high quality. Being based on the description of the first method, the explanation of this second method is a little shorter. FIG. 6 shows a part of a composite-insert sheet where a paper inlet 3 has been applied in proper position to a backing film 17. Like in the first method, the composite-core sheet may have a plurality of blanks. In that case, the paper inserts are arranged side by side in correct relative position.

As can be seen in FIG. 7, the paper insert 3 is distinguished as a raised portion from the plane surface of the film 17. Under pressure and heat, the paper insert 3 is now embedded in the film 17 which is of thermoplastic for example, so that the steps formed by the edges 19 of the paper insert disappear. Thus, a plane surface is obtained on which the print 9 can be so imposed by conventional printing techniques that the printed pattern extends without interruption from the paper surface to the film surface (FIG. 9).

The embedding of the paper insert 3 in the film 17 can be dispensed with when the paper insert 3 is so thin that the steps 19 do not adversely affect the printing process. In addition, the composite core can be modified by additional openings 20 (FIG. 11) in the paper surface in such a way that printed paper-film transitions are obtained in the inner area of the blank, too.

After the composite-core sheet so manufactured and printed has been laminated with cover films 15, 16 of the same size, the indentification card is blanked to the usual size along the punched line 8. As can be seen in FIG. 10, an additional layer 18 may be inserted between the composite inlet and the rear cover film 16 prior to the final laminating process, which layer is either a composite-core sheet with the information for the back of the identification card or a film of different color.

While specific embodiments of the invention have been shown and described in detail to illustrate the application of the principles of the invention, it will be understood that the invention may be embodied otherwise without departing from such principles.

What is claimed is:

1. The method of forming a composite core constituting the information-containing layer of a multilayer, edge-welded record carrier with a printed paper insert laminated under heat and pressure between transparent films, said method comprising the steps of prepunching the paper insert in a sheet of paper; applying a separating layer to those areas, on the upper side of the sheet of paper, which surround the paper insert; positioning a thin film border on the upper side of the sheet of paper, with the inner edge of the film border extending into overlapping relation with the paper insert at all points; positioning a backing film, provided with a separating agent corresponding with the paper insert on its upper face, against the opposite side of the paper sheet with the separating agent corresponding with the paper insert; laminating the thus juxtaposed layers so positioned relative to each other; printing the upper face of the resulting laminate; and detaching the backing film and the paper area surrounding the paper insert from the printed composite core constituted by said film border and said prepunched paper insert.

2. The method claimed in claim 1, in which the separating agent is silicone rubber.

3. The method claimed in claim 1, in which the film areas surrounding the paper inserts are adapted in color to the paper inserts.

4. The method claimed in claim 1 in which the film areas surrounding the paper inserts are transparent.

* * * * *